Feb. 14, 1961 P. E. EBERSOLE, JR., ET AL 2,971,439
AMMUNITION CRADLE FOR CONTINUOUS HOIST
Filed July 1, 1952 2 Sheets-Sheet 1

INVENTORS
PAUL E. EBERSOLE, JR.
RAYMOND W. WARREN
BY
ATTORNEYS

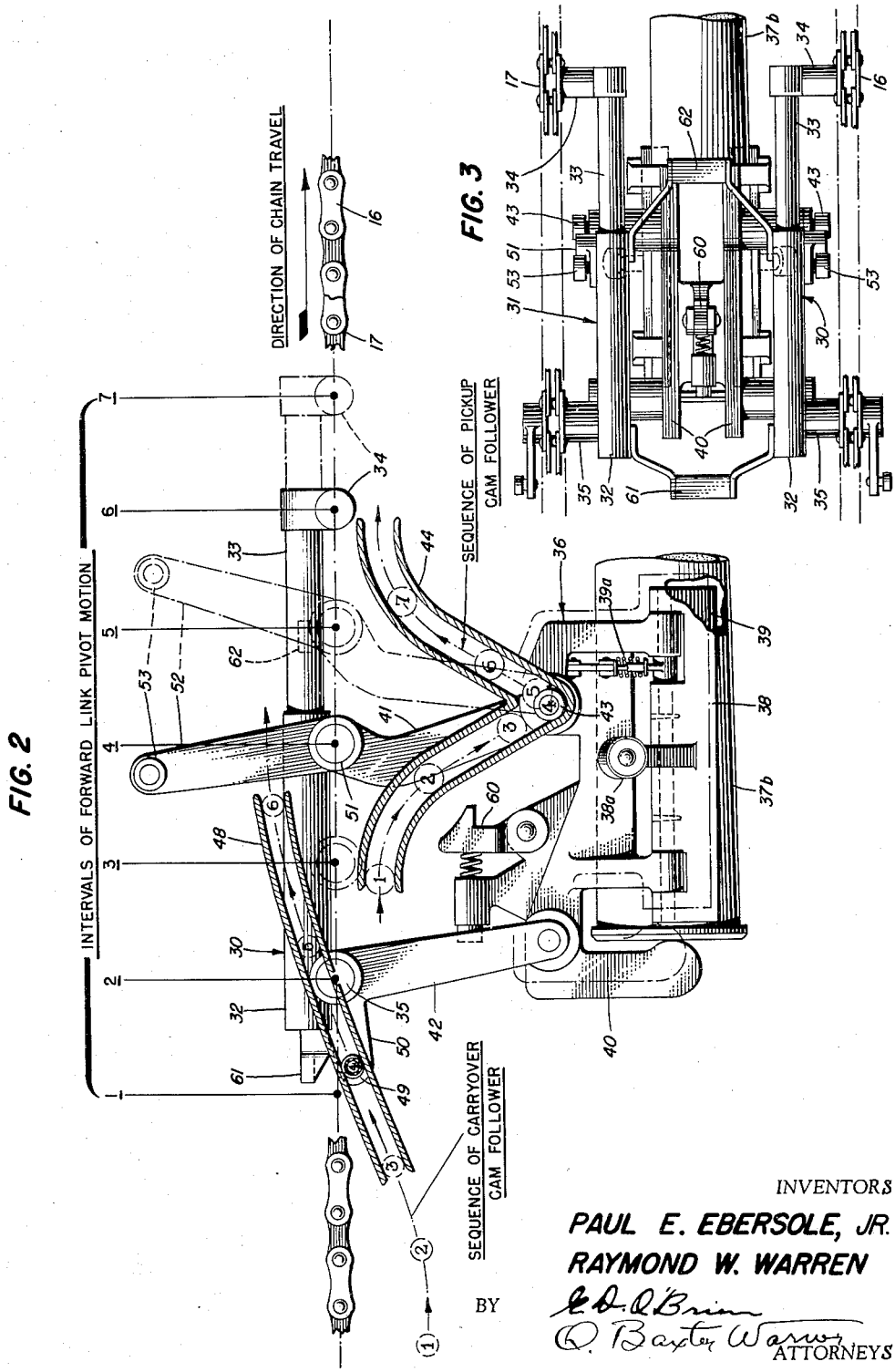

United States Patent Office 2,971,439
Patented Feb. 14, 1961

2,971,439
AMMUNITION CRADLE FOR CONTINUOUS HOIST

Paul E. Ebersole, Jr., 4923 N. 34th Road, Arlington, Va., and Raymond W. Warren, Rte. 2, Box 555, McLean, Va.

Filed July 1, 1952, Ser. No. 296,778

7 Claims. (Cl. 89—46)

(Granted under Title 35, U.S. Code (1952), sec. 266)

The invention described herein may be manufactured and used by or for the Government of the United States of America for governmental purposes without the payment of any royalties thereon or therefor.

The invention relates to improvements in conveyors and more particularly to conveyors designed to operate continuously at relatively high rates of speed, but which can pick up an object without impact at one station, convey it to another station and there release or catapult the object at a speed higher than that of the conveyor itself.

While the primary object of the invention is to provide a continuous ammunition hoist for use with modern automatic rapid fire guns, the invention is not limited to such use inasmuch as the principle of operation may be readily applied to meet the general need for a simple, efficient and rapid conveyor of this character. In some respects, this hoist is similar to the continuous hoist disclosed in the copending application of Haviland H. Platt et al., Serial No. 225,742, filed May 11, 1951.

An important object of the invention is to provide a continuous conveyor with article engaging carriers which decelerate from conveyor speed substantially to a stop for engagement with the object and thereafter accelerate smoothly to conveyor speed without interruption of conveyor operation.

Another object of the invention is to provide a continuous conveyor with article engaging carriers so constructed as to permit variation in the velocity of the carriers while the conveyor moves at constant speed.

A further object is to provide an improved continuous hoist for transporting fixed ammunition from a magazine directly into a gun breech whereby the operation of the gun is rendered fully automatic.

A further object is to provide a continuous conveyor so constructed as to permit temporary acceleration of the article carriers from conveyor chain speed to impart a catapulting force to the article at the moment of release while the conveyor chain is moving at a constant velocity.

Another object is the provision of a continuous conveyor so constructed as to permit lower conveyor velocity, minimize pickup force and reduce the power required for operation.

A still further object is to provide an improved constant velocity ammunition hoist capable of picking up a stationary round without impact and smoothly accelerating it to conveyor speed.

The invention also aims to provide a constant velocity ammunition hoist capable of ramming a round directly into a gun breech at a velocity greater than that of the hoist.

Other objects and many of the attendant advantages of this invention will be readily appreciated as the same becomes better understood by reference to the following detailed description when considered in connection with the accompanying drawings wherein:

Fig. 1 is a fragmentary diagrammatic view in side elevation of the improved ammunition hoist and associated cam arrangement and Fig. 2 is a fragmentary diagrammatic view in side elevation of one of the hoist cradles with parts associated therewith and showing a modification of the cam arrangement of Fig. 1.

Fig. 3 is a plan view of the hoist cradle and associated parts shown in Fig. 2.

Figure 1:
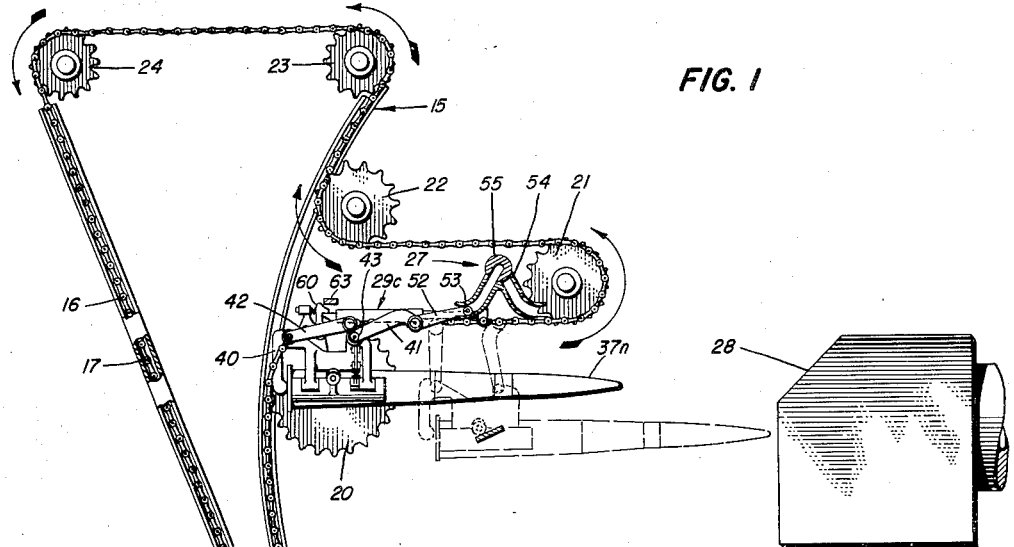
Figure 1:
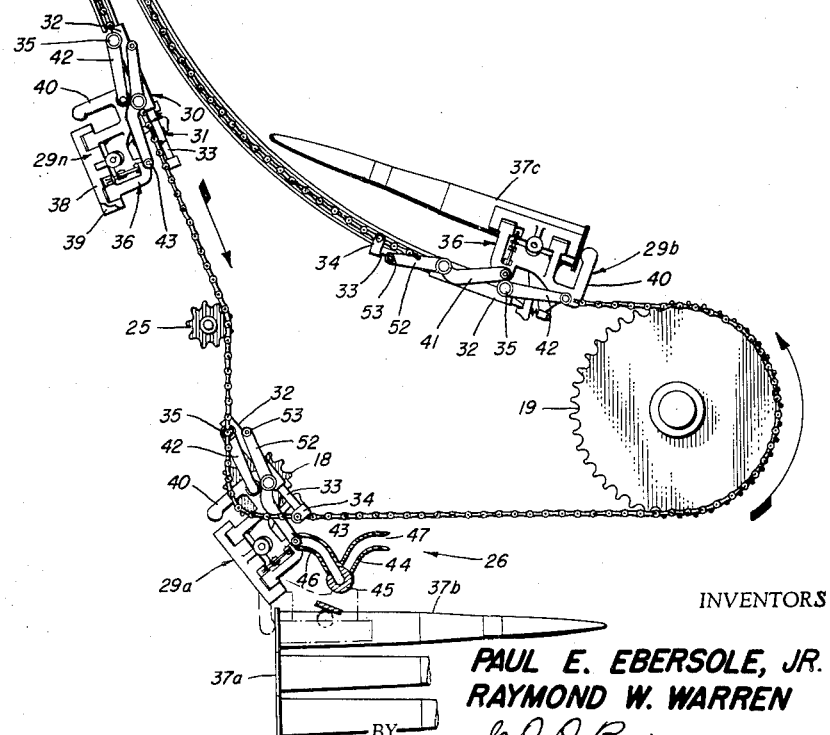

In the drawings, which for the purpose of illustration show preferred and modified forms of the invention, and wherein similar reference characters denote corresponding parts throughout the views, the numeral 15 generally designates the improved hoist including dual endless flexible linear elements 16, 17, such as the roller chains disclosed in the hereinbefore mentioned application Serial No. 225,742. These linear elements are guided by several sets of dual spaced sprockets 18–25 for movement at constant speed past a pickup station 26 and a release or ramming station 27 rearwardly of the gun breech 28.

Carried between the chains at intervals are hoist cradles 29a, b, c . . . n, similar to the cradles disclosed in the previously mentioned reference application in that they are of H-form in plan and each comprises a pair of spaced parallel side members 30, 31, including rear outer tubes 32 and forward inner extension bars 33 which telescope to permit variation of the distance between the forward and rear chain attachment pins 34, 35 responsive to flexing of the chain in rounding a sprocket.

Each hoist cradle 29a, b, c . . . n, also includes a tray 36 shaped to receive a cylindrical object such as one of a series of projectiles 37a, b, c . . . n, the tray also serving as a gripper jaw carrier supporting a pair of elongate gripper jaws 38, 39, movable between open and closed positions to engage and release a projectile resting against the tray. These jaws may be automatically cammed closed and then held closed at the pickup station and cammed open and then held open at the discharge or ramming station by any suitable mechanism such as cams 38a and spring toggle levers 39a similar to those disclosed in the previously mentioned application Serial No. 225,742. At the rear of each tray is a laterally projecting accelerating foot 40 for contacting the projectile base so that a projectile being carried is supported by the gripper jaws 38, 39 along each side and by the accelerating foot 40 at the rear.

Each tray or gripper jaw carrier 36 is connected at opposite sides to the rear outer tubes of a cradle base by dual sets of parallel linkage, each set comprising forward and rear links 41, 42. The forward links 41 are bent to afford clearance for the retraction of the forward chain attachment pins 34.

Projecting laterally outwardly from the forward link 41 at the right side of each cradle is a pickup cam follower roller 43 coacting with a V-shaped stationary pickup cam 44 at the pickup station 26 to swing the tray or gripper carrier 36 in a clockwise direction as viewed in the drawings while the cradle is passing the pickup station. At the apex of the V, in the example shown in Fig. 1, this pickup cam is provided with a rotary switch portion 45 which may be mechanically reciprocated by any suitable means (not shown) in time with the hoist so that it swings over from the entrance leg 46 of the V to the exit leg 47 as the follower roller 43 dwells at the center of the apex.

An optional positioning device is shown in Fig. 2 utilizing an auxiliary carryover cam 48 which is fixed and which engages a carryover cam follower roller 49 during the interval of uncertain positioning of the pickup cam follower roller 43 in the apex of cam 44. The carryover cam follower roller 49 is mounted on a lever arm 50 forming part of the rear link 42 at the right side of each cradle. The carryover cam arrangement is advantageous in that it eliminates the need for the moving switch cam 45 in the apex of the V-shaped main pickup cam of Fig. 1.

Extending from the forward link 41 at the cradle pivot 51 is a lever arm 52 provided with an outwardly projecting accelerating or ramming cam follower roller 53 coacting with a preferably V-shaped stationary accelerating or ramming cam 54 at the discharge or ramming station 27 to swing the gripper carrier in a counterclockwise direction as viewed in the drawings while the cradle is passing the ramming station. This accelerating or ramming cam 54 is preferably provided with a rotary switch portion 55 similar to that of the pickup cam 47 of Fig. 1.

In operation, the projectiles 37a, b, c . . . n may be supplied to the pickup station 26 in any suitable way, such as by an endless chain arrangement (not shown). The cradles 29a, b, c . . . n, when passing the loading station 26 pick up the stationary projectiles without impact and accelerate them smoothly to chain speed in the following way. As the cradle approaches the pickup station, the cradle links 41, 42 which are in a forward position are rotated by the cam 44 in a clockwise direction until at the pickup position they have swung out normal to the chain and at that instant have a tangential velocity at the gripper carrier ends equal to chain speed but in the opposite direction. The round carrier or tray 36 thus has zero absolute velocity. The carrier is given a motion substantially straight toward the round to permit time to close the cradle grippers 38, 39. The round is then accelerated to chain velocity as the links 41, 42 are decelerated and reach the rear position.

As the cradle carrying the round enters the ramming run, the cradle links 41, 42, are rotated in a counterclockwise direction, as viewed in Fig. 1, this motion giving the round a velocity above that of the chain. At the 90° position of the links the cradle grippers 38, 39 are opened, as by the mechanism disclosed in the reference application Serial No. 225,742 and the cradle links continue to move the gripper carrier or tray 36 to the forward position. The maximum tangential velocity of the link ends is reached at the 90° position and then equals the difference between the chain velocity and the desired ramming velocity. By changing the cam 54 controlling this catapult action it is possible to maintain a required ramming velocity at a decreased rate of fire with consequent lower chain velocity.

By so placing the pickup cam 44 that the follower roller 43 enters it while the cradle is coming around the small sprocket 18, the cartridge 37b may be picked up only a short distance beyond the sprocket 18, thus minimizing hoist chain length and permitting horizontal pickup in close quarters. In ramming, the length of the ramming run is reduced by a similar expedient, the ramming action being initiated shortly before the cradle leaves the ramming sprocket 20 and the retraction of the tray being effected while the cradle is rounding the launching sprocket 21.

Each gripper carrier 36 is held aft following pickup and held forward following release or ramming as by a spring latch 60 releasably engaging aft and forward striker bars 61, 62 respectively, release of the latch being effected by engagement with suitable stationary cams, such as the cam 63 shown at the release or ramming station in Fig. 1.

Obviously many modifications and variations of the present invention are possible in the light of the above teachings. It is therefore to be understood that within the scope of the appended claims the invention may be practiced otherwise than as specifically described.

What is claimed is:

1. In a conveyor of the character described, a linear element moving along a conveyor path and passing a pickup station, a cradle base fastened to the linear element for movement therewith, a gripper carrier, object gripping mechanism on said gripper carrier, parallel linkage supporting said gripper carrier for swinging movement from a forward to a rearward position relative to said base to decelerate the carrier, a pickup cam follower connected to said parallel linkage, and a cam at said pickup station acting on said cam follower to swing said carrier rearwardly on said parallel linkage as the cradle base passes the pickup station, thus decelerating the carrier for object pickup without impact.

2. In the conveyor specified in claim 1, said cradle base having forward and rear portions fastened to the linear element at forwardly and rearwardly spaced points respectively and relatively slidable to permit variation in cradle base length upon rounding a turn in the conveyor path, said parallel linkage being pivoted to one of said base portions.

3. In a conveyor of the character described, a linear element moving along a conveyor path and passing a discharge station, a cradle base fastened to the linear element for movement therewith, a gripper carrier, releasable object gripping mechanism on said gripper carrier, parallel linkage supporting said gripper carrier for swinging movement from a rearward to a forward position relative to said base to accelerate the carrier, an accelerating cam follower connected to said parallel linkage, and a cam at said discharge station acting on said cam follower to swing said carrier forwardly on said parallel linkage as the cradle base passes the discharge station, thus accelerating the carrier for object discharge with a catapulting force.

4. In the conveyor specified in claim 3, said cradle base having forward and rear portions fastened to the linear element at forwardly and rearwardly spaced points respectively and relatively slidable to permit variation in cradle base length upon rounding a turn in the conveyor path, said parallel linkage being pivoted to one of said base portions.

5. In a conveyor of the character described, a continuously movable endless flexible linear element defining a conveyor path passing a pickup station and a discharge station, a cradle base fastened to the linear element for continuous movement therewith, a gripper carrier, object gripping and releasing mechanism on said gripper carrier, parallel linkage supporting said gripper carrier for swinging movement rearwardly and forwardly of said base to respectively decelerate and accelerate the carrier relative to the continuously moving cradle base, cam followers connected to said parallel linkage, and cams at said pickup and discharge stations acting on said cam followers to swing said carrier rearwardly at the pickup station and thus decelerate the carrier for object pickup without impact and to swing said carrier forwardly at the discharge station for object release with catapulting force.

6. In an ammunition hoist, an endless flexible linear element continuously movable along a conveyor path between a cartridge pickup station and a ramming station, a cradle base fastened to the linear element for continuous movement therewith, a gripper carrier, cartridge gripping and releasing mechanism on said gripper carrier, parallel linkage supporting said gripper carrier for swinging movement rearwardly and forwardly of said base to respectively decelerate and accelerate the carrier relative to the continuously moving cradle base, cam followers connected to said parallel linkage, and cams at said pickup and ramming stations respectively acting on said cam followers to swing said carrier rearwardly for cartridge pickup without impact and to swing said carrier forwardly for cartridge ramming with catapulting force.

7. In an ammunition hoist, an endless flexible linear element continuously movable along a conveyor path between a cartridge pickup station and a ramming station, a cradle base fastened to the linear element for continuous movement therewith, a gripper carrier, cartridge gripping and releasing mechanism on said gripper carrier, parallel linkage supporting said gripper carrier for swinging movement rearwardly and forwardly of said base to respectively decelerate and accelerate the carrier relative to the continuously moving cradle base, a pickup cam follower mounted on said parallel linkage adjacent said gripper carrier, an arm combining with said linkage adjacent said cradle base to form a lever, a ramming cam follower mounted on said lever arm, and cams at said pickup and ramming stations respectively acting on said cam followers to swing said carrier rearwardly for cartridge pickup without impact and to swing said carrier forwardly for cartridge ramming with catapulting force.

References Cited in the file of this patent

UNITED STATES PATENTS

| | | |
|---|---|---|
| 599,568 | Lewis | Feb. 22, 1898 |
| 1,282,462 | Ricks | Oct. 22, 1918 |

FOREIGN PATENTS

| | | |
|---|---|---|
| 674,852 | France | Oct. 28, 1929 |